(12) United States Patent
Sunkavalli et al.

(10) Patent No.: US 10,070,111 B2
(45) Date of Patent: Sep. 4, 2018

(54) LOCAL WHITE BALANCE UNDER MIXED ILLUMINATION USING FLASH PHOTOGRAPHY

(71) Applicant: ADOBE SYSTEMS INCORPORATED, San Jose, CA (US)

(72) Inventors: Kalyan K. Sunkavalli, San Jose, CA (US); Zhuo Hui, Pittsburgh, PA (US); Sunil Hadap, Dublin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/978,605

(22) Filed: Dec. 22, 2015

(65) Prior Publication Data

US 2017/0180692 A1    Jun. 22, 2017

(51) Int. Cl.
| | |
|---|---|
| *H04N 9/73* | (2006.01) |
| *H04N 5/225* | (2006.01) |
| *G06K 9/46* | (2006.01) |
| *G06K 9/62* | (2006.01) |
| *G06K 9/52* | (2006.01) |
| *G06T 7/60* | (2017.01) |
| *G06T 7/40* | (2017.01) |

(52) U.S. Cl.
CPC ........... *H04N 9/735* (2013.01); *G06K 9/4652* (2013.01); *G06K 9/4661* (2013.01); *G06K 9/52* (2013.01); *G06K 9/6215* (2013.01); *G06T 7/408* (2013.01); *G06T 7/60* (2013.01); *H04N 5/2256* (2013.01); *G06K 2009/4666* (2013.01)

(58) Field of Classification Search
CPC ..... H04N 9/735; H04N 5/2256; G06K 9/4652
See application file for complete search history.

(56) References Cited

U.S. PATENT DOCUMENTS 5,568,194 A * 10/1996 Abe ................. H04N 9/735
                                                    348/223.1
5,808,681 A * 9/1998 Kitajima ............ H04N 9/735
                                                    348/223.1

(Continued)

OTHER PUBLICATIONS

Georg Petschnigg et al; Digital Photography with Flash and No-Flash Image pairs, acm Transaction on Graphics, vol. 23, No. 3, pp. 664-672, Aug. 2004.*

(Continued)

*Primary Examiner* — Cynthia Segura
(74) *Attorney, Agent, or Firm* — Shook, Hardy & Bacon L.L.P.

(57) ABSTRACT

Embodiments of the present invention facilitate automatically white-balancing images captured under mixed lighting conditions. More particularly, some embodiments are directed to leveraging flash photography to capture two images in quick succession, one with the flash activated and one without. By combining these two images, a per-pixel white balance kernel can be automatically determined and used to generate a white-balanced image without requiring any user input or user assumptions about the lighting in the scene. In embodiments, the white balance kernels for pixels that lie in the shadow or appear as specular spots are masked and can be interpolated from the white balance kernels at unmasked kernels. Motion effects between the flash and non-flash images may also be reduced.

19 Claims, 19 Drawing Sheets

(15 of 19 Drawing Sheet(s) Filed in Color)

(56) References Cited

U.S. PATENT DOCUMENTS

| | | | | |
|---|---|---|---|---|
| 6,018,349 A * | 1/2000 | Szeliski | | G06T 3/0068 |
| | | | | 345/629 |
| 7,583,297 B2 * | 9/2009 | Yamada | | H04N 5/2354 |
| | | | | 348/224.1 |
| 7,590,344 B2 * | 9/2009 | Petschnigg | | G03B 15/03 |
| | | | | 382/275 |
| 7,688,358 B2 * | 3/2010 | Miki | | H04N 9/735 |
| | | | | 348/223.1 |
| 7,724,952 B2 * | 5/2010 | Shum | | H04N 5/275 |
| | | | | 382/173 |
| 7,817,823 B1 * | 10/2010 | O'Donnell | | G06T 15/60 |
| | | | | 345/426 |
| 8,558,944 B2 * | 10/2013 | Makii | | H04N 5/23245 |
| | | | | 348/224.1 |
| 9,936,141 B2 * | 4/2018 | Kitajima | | H04N 5/2351 |
| 2002/0076219 A1 * | 6/2002 | Uchino | | G03B 17/48 |
| | | | | 396/429 |
| 2005/0190288 A1 * | 9/2005 | Yamada | | H04N 5/2354 |
| | | | | 348/371 |
| 2005/0243175 A1 * | 11/2005 | Yamada | | H04N 5/2354 |
| | | | | 348/207.1 |
| 2006/0008171 A1 * | 1/2006 | Petschnigg | | G06T 5/50 |
| | | | | 382/254 |
| 2006/0132642 A1 * | 6/2006 | Hosaka | | H04N 5/217 |
| | | | | 348/370 |
| 2007/0165960 A1 * | 7/2007 | Yamada | | H04N 9/735 |
| | | | | 382/254 |
| 2008/0143845 A1 * | 6/2008 | Miki | | H04N 9/735 |
| | | | | 348/223.1 |
| 2009/0040335 A1 * | 2/2009 | Ito | | H04N 9/735 |
| | | | | 348/223.1 |
| 2009/0110322 A1 * | 4/2009 | Hadap | | G06T 15/506 |
| | | | | 382/274 |
| 2010/0201840 A1 * | 8/2010 | Ajito | | H04N 5/2354 |
| | | | | 348/223.1 |
| 2011/0123118 A1 * | 5/2011 | Nayar | | G06T 11/60 |
| | | | | 382/190 |
| 2011/0157413 A1 * | 6/2011 | Yoshida | | H04N 9/735 |
| | | | | 348/223.1 |
| 2011/0292216 A1 * | 12/2011 | Fergus | | G03B 15/03 |
| | | | | 348/164 |
| 2012/0274798 A1 * | 11/2012 | Takahashi | | H04N 9/045 |
| | | | | 348/222.1 |
| 2012/0281108 A1 * | 11/2012 | Fukui | | H04N 5/144 |
| | | | | 348/223.1 |
| 2013/0278798 A1 * | 10/2013 | Hattori | | H04N 5/2351 |
| | | | | 348/234 |
| 2014/0176759 A1 * | 6/2014 | Goto | | H04N 5/2354 |
| | | | | 348/224.1 |
| 2014/0240477 A1 * | 8/2014 | Feng | | H04N 5/217 |
| | | | | 348/77 |
| 2016/0191881 A1 * | 6/2016 | Sako | | H04N 9/735 |
| | | | | 348/224.1 |
| 2016/0219206 A1 * | 7/2016 | Miyazaki | | H04N 5/2351 |
| 2016/0227182 A1 * | 8/2016 | Uekusa | | H04N 5/2354 |
| 2017/0013242 A1 * | 1/2017 | Fujiwara | | H04N 9/735 |
| 2017/0013243 A1 * | 1/2017 | Fujiwara | | H04N 9/735 |
| 2017/0142387 A1 * | 5/2017 | Saito | | H04N 9/735 |
| 2017/0180691 A1 * | 6/2017 | Sunkavalli | | H04N 9/73 |

OTHER PUBLICATIONS

Richard Szeliski; Image Alignment and Stitching: A Tutorial; Microsoft; MSR-TR-2004-92; Dec. 2006; p. 53.*

Boyadzhiev et al., "User-Guided White Balance for Mixed Lighting Conditions," ACM Trans. Graph., 31(6):200, 2012, 10 pp.

Tan et al., "Separating Reflection Components of Textured Surfaces Using a Single Image," Pattern Analysis and Machine Intelligence, IEEE Transactions on, 27(2):178-193, 2005.

Bousseau, A., Paris, S., & Durand, F. (2009). User-assisted intrinsic images. ACM Transactions on Graphics (TOG), 28(5), 130.

Ebner, M. (May 2004). Color constancy using local color shifts. In European Conference on Computer Vision (pp. 276-287). Springer, Berlin, Heidelberg.

Hsu, E., Mertens, T., Paris, S., Avidan, S., & Durand, F. (Aug. 2008). Light mixture estimation for spatially varying white balance. In ACM Transactions on Graphics (TOG) (vol. 27, No. 3, p. 70). ACM.

* cited by examiner

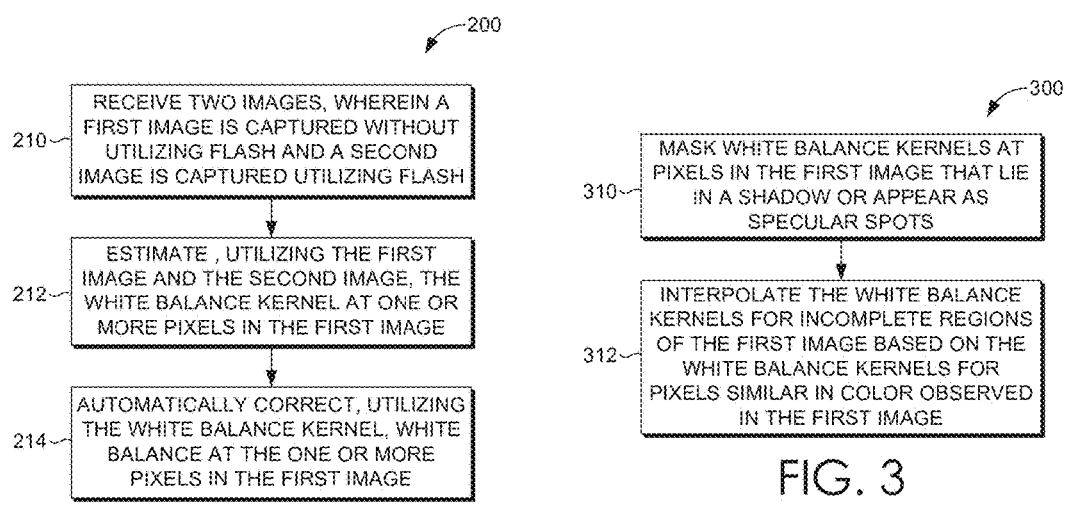

LOCAL WHITE BALANCE UNDER MIXED ILLUMINATION USING FLASH PHOTOGRAPHY

BACKGROUND

Photographs are often captured under lights with different colors leading to different color casts. For example, in outdoor photographs, illumination from the sun tends to range from white to orange while skylight tends to be blue. Similarly, photographs captured indoors might have a combination of natural lights and incandescent lighting. These combinations of illuminants lead to different color casts in different parts of images. Correcting the color of the lighting in a photograph, a process called white-balancing or color correction, is difficult even when there is only one kind of illumination in the scene. However, it becomes extremely challenging under mixed illumination because each pixel in the image has a different combination of lighting and needs to be handled differently.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to automatically white-balancing images captured under mixed lighting conditions. More particularly, some embodiments are directed to leveraging flash photography to capture two images in quick succession, one with the flash activated and one without. By combining these two images, a per-pixel white balance kernel can be automatically determined and used to generate a white-balanced image without requiring any user input or user assumptions about the lighting in the scene. For clarity, the white balance kernel is the correction factor that can be applied at each pixel in the image such that the color of the lights at each pixel can be tuned as neutral. In other words, the white balance kernel can be utilized to convert the color of light that appears in the image to white. This correction prevents the color of an object in the image from being distorted from the ground truth.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is described in detail below with reference to the attached drawing figures, wherein:

FIG. 2 is a flow diagram for automatically white balancing an image, in accordance with an embodiment of the present invention;

FIG. 3 is a flow diagram showing a method for automatically white balancing shadow pixels or specular spots in an image, in accordance with an embodiment of the present invention;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed previously, photographs are often captured under lights with different colors leading to different color casts in different parts of images. Correcting the color of the lighting in a photograph is difficult even when there is only one kind of illumination in the scene. Under mixed illumination, it is extremely challenging because each pixel in the image has a different combination of lighting and needs to be handled differently. Such images often need to be corrected manually which requires considerable skill and time from the photographer.

Some embodiments of the present invention are directed to automatically white-balancing images captured under mixed lighting conditions. More particularly, some embodiments are directed to eliminating the color of the ambient lights from the scene. To do so, flash photography is leveraged to capture two images in quick succession, one with the flash activated and one without. By combining these two images, a white balance kernel can be determined for each pixel using a technique that does not require any user input or user assumptions about the lighting in the scene. In embodiments, as described in more detail below, the white balance kernels for pixels that lie in the shadow or appear as specular spots (i.e., reflective) can be masked and interpolated from the white balance kernels at unmasked kernels. Motion effects between the flash and non-flash images may also be similarly reduced.

Figure 1:
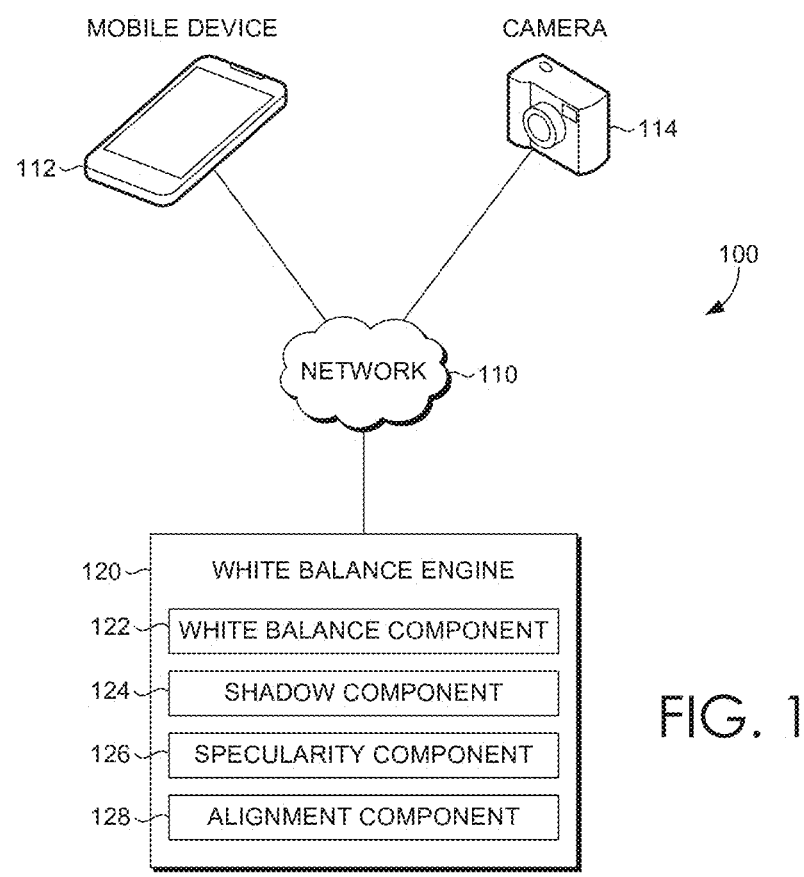
FIG. 1 is a block diagram showing a system for automatically white-balancing images captured under mixed lighting conditions, in accordance with an embodiment of the present invention.

Referring now to FIG. 1, a block diagram is provided that illustrates a white balancing system 100 for automatically white-balancing images captured under mixed lighting conditions, in accordance with embodiments of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The white balancing system 100 generally operates to provide automated white balancing of an image. To do so, two images are received, such as from a camera or mobile device. The first image is captured without utilizing flash and the second image is captured utilizing flash. In some embodiments, the white balance kernel is estimated, utilizing the flash and the non-flash images, for one or more pixels in the non-flash image and the white balance is automatically corrected one or more pixels in the non-flash image. In some embodiments, white balance correction is automatically interpolated for unreliable pixels (e.g., where there is shadow, specularity, incompleteness, or motion) based on similar pixels observed in the first (i.e., non-flash) image. In this way, it is assumed that white balance kernels for pixels similar in color should be nearly the same.

Among other components not shown, the system 100 includes a mobile device 112, a camera 114, and a white balance engine 120. It should be understood that the system 100 shown in FIG. 1 is an example of one suitable computing system architecture. Each of the components shown in FIG. 1 may be implemented via any type of computing device, such as computing device 2000 described with reference to FIG. 2000, for example. The components may communicate with each other via a network 110, which may include, without limitation, one or more local area networks (LANs) and/or wide area networks (WANs). Such networking environments are commonplace in offices, enterprise-wide computer networks, intranets, and the Internet.

It should be understood that any number of mobile devices, cameras, white balance engines, and networks may be employed within the system 100 within the scope of the present invention. Each may comprise a single device or multiple devices cooperating in a distributed environment. For instance, the white balance engine 120 may be provided via multiple devices arranged in a distributed environment that collectively provide the functionality described herein. In another instance, portions of the white balance engine 120 may be provided by the mobile device 112, camera 114, or as a web service provided in the cloud. Additionally, other components not shown may also be included within the environment 100, while components shown in FIG. 1 may be omitted in some embodiments.

The mobile device 112 and/or camera 114 may be any type of computing device owned and/or operated by a user that can capture images. In some embodiments, the mobile device 112 and/or camera 114 may allow the user to access network 110. Generally, a user may employ the mobile device 112 and/or camera 114 to, among other things, capture two images of a scene, in quick succession, one with the camera flash activated and one without the camera flash. White balance correction may automatically be performed by the white balance engine 120 without extensive user input or some knowledge about the lights, material properties, and geometry of the scene. To do so, the user may employ the white balance engine 120 on the mobile device 112 and/or camera 114 to white balance the scene.

In some embodiments, white balance engine 120 is configured to facilitate automatically white balancing images captured under mixed lighting conditions by leveraging flash photography. Typically, white balance engine 120 communicates with the mobile device 112 and/or camera 114 to receive the two images of the scene. White balance engine 120 automatically white-balances the scene and provides the white-balanced image to the user via the mobile device 112 and/or camera 114. In accordance with embodiments described herein, the white balance engine 120 includes a white balance component 122, a shadow component 124, a specularity component 126, and an alignment component 128. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules are implemented as stand-alone applications. In other embodiments, one or more of the illustrated components/modules are integrated directly into the operating system of the white balance engine 120, the mobile device 112, and/or the camera 114. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the white balance engine 120 might reside on a server, cluster of servers, or a computing device remote from or integrated with one or more of the remaining components.

The white balance engine 120 may be any type of computing device, or incorporated into a computing device, that can access a network (e.g., network 110). For instance, the white balance engine 120 may be a desktop computer, a laptop computer, a tablet computer, a mobile device, a server, or any other device, or portion thereof, having network access. Generally, a user employs the white balance engine 120 via the mobile device 112 and/or camera 114 to, among other things, automatically white balance a scene in an image.

As previously mentioned, in embodiments, the white balance engine 120 includes a white balance component 122, a shadow component 124, a specularity component 126, and an alignment component 128 to automatically white balance a scene in an image. In particular, white balance engine 120 communicates with the mobile device 112 and/or camera 114 to automatically white balance a scene in an image. Generally, to initiate automatic white balancing, an image is captured by the mobile device 112 and/or camera 114.

The white balance component 122 is generally configured to receive two images comprising a scene from the mobile device 112 and/or camera 114 and to perform white balancing. A first image is captured utilizing flash and a second image is captured without utilizing flash. Each of the images is taken in quick succession to capture the same or nearly the same scene. By combining these two images, a per-pixel white balance kernel can be determined using a technique that does not require any user input or user assumptions about the lighting in the scene. To do so, the white balance component 122 derives a closed form solution for the per-pixel white balance kernel where all the variables involved can be acquired.

Several assumptions may be made by the white balance component 122. First, it is assumed that most of the objects appearing in the scene are Lambertian so that the intensity observed is the product of the albedo (i.e., a reflection coefficient) and shading. Lambertian refers to a property that defines a diffusely reflecting surface. The apparent brightness of a Lambertian surface is the same to an observer regardless of the observer's angle of view. Second, it is assumed that the image intensities can be preserved after white balance. Lastly, it is assumed that the color of the flash can be acquired via calibration with the white balance component 122.

Not all the assumptions that are made by the white balance component 122 holds true for the pixels that lie in the shadow or appear as specular spots. In these cases, shadow component 124 and/or specularity component 126 are generally configured to account for these pixels. To do so, in some embodiments, the shadow component 124 masks the white balance kernels at these pixels as incomplete. Then, the shadow component 124 interpolates the white balance kernels for the incomplete regions based on similar pixels (i.e., similar in color) observed in the non-flash image. In essence, the shadow component 124 relies on the fact that the white balance kernels for the similar pixels in color should be nearly the same. Hence, the shadow component 124 detects these pixels first and then interpolates the white balance kernels from the unmasked pixels. Morphology operations (for example, "dilate" and "erode") can be utilized to fill holes in the shadow pixels.

As described above, the derivation for the white balance kernel is based on the fact that the Lambertian assumption can be held for most of the real life scenes. However, the flash may inspire specularity in the scene and violate the Lambertian assumption. Specularity component 126 may leverage the fact that the number of the specular pixels in a given scene is relatively small and the white balance kernel can be exploited from the neighboring pixels to interpolate them. Hence, similar to the shadow treatment, specularity component 126 first masks the specular pixels and then interpolates them from the unmasked regions. Specularity component 126 detects the specular pixels based on the fact that they introduce stronger gradient in the flash image than the non-flash one. Morphology operations (for example, "dilate" and "erode") can be utilized to fill holes in the specular pixels.

The derivation of the white balance kernel assumes that there is no motion between the flash and the non-flash images. However, in practice, this assumption may not hold based on motion of the camera or the subjects in the scene. Alignment component 128 is generally configured to compensate for any such motion. There are two types of motion, rigid motion and non-rigid motion. The rigid motion is caused by the motion of the camera, such as hand shake. In embodiments, alignment component 128 aligns the flash and the non-flash image based on scale-invariant feature transform (SIFT) and Random sample consensus (RANSAC), and then implements the white balance on the registered images. Alignment component 128 relies on the fact that SIFT features are insensitive to the illumination changes and RANSAC is robust and can find the inliers to match the SIFT features.

For the non-rigid motion, alignment component 128 assumes that the background is static or under a rigid motion so that it can register the pixels via SIFT+RANSAC. As can be expected, the non-rigid motion only occurs for the dynamic subjects in the scene. Alignment component 128 first aligns the flash and non-flash image and implements the white balance algorithm to obtain reliable results for the pixels lie in the background. Alignment component 128 then propagates the information from the background to the foreground via the white balance kernel interpolation. However, alignment component 128 must detect the pixels which are not reliable and may have moved between the non-flash and flash images. Alignment component 128 relies on the core principle that the pixels with similar color should possess the same white balance kernel.

Referring next to FIG. 2, a flow diagram is provided that illustrates a method 200 for automatically white balancing an image in accordance with an embodiment of the present invention. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be provided as part of a white balancing system, such as the white balancing system 100 of FIG. 1. Accordingly, the method may be carried out utilizing any of the algorithms described herein.

As shown at step 210, two images are received. A first image is captured without utilizing flash and a second image is captured utilizing flash. Each of the images may be captured by any device that includes camera functionality, such as a traditional camera or a mobile device. The white balance kernel is estimated, utilizing the first image and the second image, at step 212, at one or more pixels in the first image.

Initially, the image captured without flash shooting ($I_{nf}$) and the corresponding flash image ($I_f$) is received. For a specific pixel p, the intensity value for a single color channel c of $I_{nf}$ is defined based on the Lambertian assumption:

$$I_{nf}^c(p)=R^c(p)\Sigma_i\lambda_i(p)l_i^c(p) \qquad \text{Equation (1)}$$

In Equation (1), R denotes the albedo and $l_i$ is the color of each light source in the scene. Similarly, the intensity value for the flash image can be defined by:

$$I_f^c(p)=R^c(p)\Sigma_i\lambda_i(p)l_i^c(p)+R^c(p)\lambda_f(p)l_f^c(p) \qquad \text{Equation (2)}$$

In Equation (2), $\lambda_f(p)$ and $l_f^c(p)$ denote the shading term and the color of the flash. A per-pixel kernel Wc (i.e., the correction factor) is identified for each color channel c such that the white balanced image ($\hat{I}_{nf}$) can be represented as:

$$\hat{I}_{nf}^c(p)=W^c(p)R^c(p)\Sigma_i\lambda_i(p)l_i^c(p)=R^c(p)\Sigma_i\lambda_i(p)\eta(p) \qquad \text{Equation (3)}$$

In Equation (3), η is a scalar and does not vary across the color channels. Specifically, the white balance kernel can be expressed by:

$$\Sigma_i\lambda_i(p)W^c(p)l_i^c(p)=\Sigma_i\lambda_i(p)\eta(p) \qquad \text{Equation (4)}$$

However, the number or the colors of lighting sources is unknown which makes the problem difficult to solve. By receiving the flash image of the same scene, the freedom of the problem is reduced. It is assumed that the intensity does not change after white balance, which suggests only chromaticity values are affected while the intensity related variables are retained. This can be summarized as:

$$I_{nf}^r(p)+I_{nf}^g(p)+I_{nf}^b(p)=\hat{I}_{nf}^r(p)+\hat{I}_{nf}^g(p)+\hat{I}_{nf}^b(p).\qquad 5$$

The assumption introduces one more constraint on the problem and the white balance kernel is expressed in terms of the chromaticity, which can eliminate the effect of the shading terms. To obtain that, the chromaticity for the color channel c of the non-flash image and corresponding white balance one is denoted as $C_{nf}^c$ and $\hat{C}_{nf}^c$, respectively.

Based on intensity preservation, Equation (3) can be divided by the sum of the intensities, and the following equations are obtained:

$$\hat{C}_{nf}^c(p) = W^c(p)C_{nf}^c(p)$$

$$\hat{C}_{nf}^c(p) = \hat{C}_{nf}^c(p) = \frac{\hat{I}_{nf}^c(p)}{\sum_c \hat{I}_{nf}^c(p)} = \frac{R^c(p)\sum_i \lambda_i(p)\eta(p)}{\sum_c R^c \sum_i \lambda_i(p)\eta(p)} = \frac{R^c(p)}{\sum_c R^c(p)} = C_R^c$$

Therefore the following ratio is obtained:

$$\hat{C}_{nf}^c(p) = W^c(p)C_{nf}^n(p) \qquad \text{Equation (5)}$$

By introducing the flash image, the local shading term is replaced with the known variables and Equation (3) is utilized to estimate the white balance kernel. In particular, the ratio image d is introduced which can be obtained by element wise division between the flash and the non-flash image.

$$d^c(p) = \frac{I_f^c(p)}{I_{nf}^c(p)} \qquad \text{Equation (6)}$$

Substituting Equation (1) and Equation (2) into Equation (6) obtains that:

$$d^c(p) = 1 + \frac{\lambda_f(p)l_f^c(p)}{\sum_i \lambda_i(p)l_i^c(p)}$$

By denoting the local shading term $\Sigma_i\lambda_i(p)l_i^c(p)$ as $S_{nf}(p)$, it can be expressed as:

$$S_{nf}(p) = \frac{\lambda_f(p)l_f^c(p)}{d^c(p)-1} \qquad \text{Equation (7)}$$

By combining the results in Equation (7) and Equation (1) the image intensity observed at the non-flash image is expressed in terms of the knowledge of the flash as follows:

$$I_{nf}^c(p) = R^c(p)\frac{\lambda_f(p)l_f^c(p)}{d^c(p)-1}$$

Since $\lambda_f(p)$ is unknown and it is independent of the colors, the intensity chromaticity is exploited to eliminate it as an unknown as shown below:

$$C_{nf}^c(p) = \frac{R^c(p)l_f^c(p)}{d^c(p)-1}\sum_c \frac{d^c(p)-1}{R^c(p)l_f^c(p)}$$

By denoting $$\alpha^c(p) = \frac{l_f^c(p)}{d^c(p)-1}$$

the above equation can be rewritten as:

$$C_{nf}^c(p) = \frac{R^c(p)\alpha^c(p)}{\sum_c R^c(p)\alpha^c(p)}$$

By denoting $$\beta(p) = \sum_c R^c(p)\alpha^c(p)$$

the albedo in color channel c can be represented by:

$$R^c(p) = \frac{C_{nf}^c(p)\beta(p)}{\alpha^c(p)} \qquad \text{Equation (8)}$$

The sum of the albedo across all the color channels can be obtained as:

$$\sum_c R^c(p) = \beta(p)\sum_c \frac{C_{nf}^c(p)}{\alpha^c(p)}$$

which enables the chromaticity of the albedo to be obtained (and eliminated as an unknown) as:

$$C_R^c(p) = C_{nf}^c(p)\frac{1}{\alpha^c(p)\sum_c \frac{C_{nf}^c(p)}{\alpha^c(p)}} \qquad \text{Equation (9)}$$

The $\alpha$ is obtainable since the color of the flash can be acquired during calibration of the camera. Thus, according to Equation (5), the white balance kernel is defined as:

$$W^c(p) = \frac{1}{\alpha^c(p)\sum_c \frac{C_{nf}^c(p)}{\alpha^c(p)}} \qquad \text{Equation (10)}$$

In some embodiments, an intensity value for a single color channel of each image can be defined based on a Lambertian assumption. The white balance is automatically corrected, utilizing the white balance kernel, at one or more pixels in the first image, at step 214. In embodiments, the white balance is automatically corrected without requiring any user annotation. In embodiments, the white balance is automatically corrected without making any assumptions about the lighting in the scene.

In some embodiments, the first image and the second image are aligned (i.e., to correlate pixels between the images) based on scale-invariant feature transform (SIFT) and Random sample consensus (RANSAC). In this way, pixels that have a similar color but a different white balance kernel are detected. The pixels of the second image can be clustered based on intensity chromaticity. A distance may be calculated for each pixel in the cluster to a center of the cluster. The pixels can then be sorted based on the distance of each pixel to the center. The pixels with a largest distance may be masked as incomplete pixels in the white balance kernel. The white balance kernels can then be interpolated (as described below) for the incomplete pixels based on the white balance kernels for similar pixels observed in the non-flash image.

Turning now to FIG. 3, a flow diagram is provided that illustrates a method 300 for automatically white balancing shadow pixels or specular spots in an image in accordance with an embodiment of the present invention. As shown at step 310, white balance kernels are masked at pixels in the first image that lie in shadow or appear as specular spots as incomplete.

The shadow regions may indicate low light received in the pure flash image, which can be defined as the difference between the flash and the non-flash image. However, the pixels in dark albedo will also appear in low intensities. To eliminate the effect of the dark albedo, the pure flash image is divided by the non-flash image. By dividing the non-flash image, the albedo can be absorbed and the value defined only depends on the shading term which can detect the shadows more robustly. Specifically, the shadow pixels are detected based on the threshold defined for each pixel as follows:

$$\tau_{sh}(p) = \frac{\|I_f(p) - I_{nf}(p)\|_2^2}{\|I_{nf}(p) + \epsilon\|_2^2}$$

where $\epsilon$ is a small positive number which makes the denominator nonzero. All the pixels are sorted in terms of the thresholds calculated and select the minimum ten percent as the shadow pixels. The penumbra pixels may be detected by checking the gradient difference and the connectedness to the pixels that have been detected above.

The criteria for the specular pixels is defined as follows:

$$\tau_{sp}(p) = \|\nabla I_f(p) - \nabla I_{nf}(p)\|_2^2$$

Similar to the shadow treatment, all the pixels are sorted and the largest ten percent pixels are masked as specular. In some embodiments, the specular pixels are detected based on pixels introducing stronger gradient in the flash image than the non-flash one.

At step 312, after the shadow and specular pixels are masked, the white balance kernels are interpolated to complete these missing points. In particular, interpolation relies on the fact that the white balance kernels for the similar pixels in color should be nearly the same. First, the K nearest neighbors are selected in terms of intensity for a certain masked pixel from the unmasked regions. Then, the weight that each neighbor contributes to the masked pixel is calculated based on the intensity difference. For example:

$$w_i(p) = 1 - \frac{\|I_{nf}(p_i) - I_{nf}(p)\|}{\sum_{i=1}^{K} \|I_{nf}(p_i) - I_{nf}(p)\|}$$

where $p_i$ denotes the $i^{th}$ neighbor for the masked pixel p. The weights are normalized to make the sum of them equal to one.

$$\hat{w}_i(p) = \frac{w_i(p)}{\sum_i w_i(p)}$$

Thus, the white balance kernel at pixel p can be obtained as:

$$W^c(p) = \sum_{i=1}^{K} \hat{w}_i(p) W^c(p_i) \qquad \text{Equation (11)}$$

Figure 4:
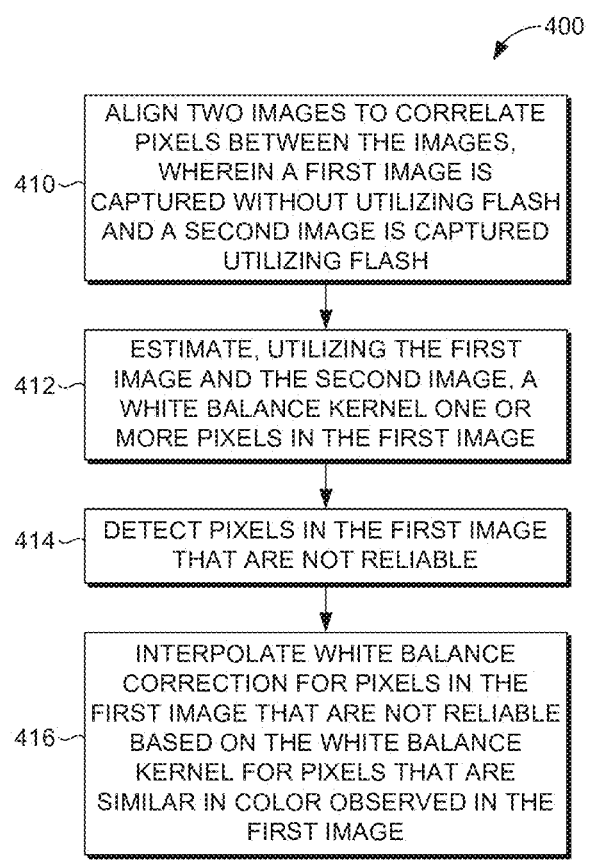
FIG. 4 is a flow diagram for automatically white balancing shadow pixels for unreliable pixels in an image, in accordance with an embodiment of the present invention.

In FIG. 4, a flow diagram is provided that illustrates a method 400 for automatically white balancing shadow pixels for unreliable pixels in an image in accordance with an embodiment of the present invention. As shown at step 410, two images are aligned to correlate pixels between the two images. A first image is captured without utilizing flash and a second image is captured utilizing flash. At step 412, a white balance kernel is estimated at one or more pixels in the first image.

Unreliable pixels in the first image are detected, at step 414. In some embodiments, unreliable pixels include shadow regions, specular regions, or regions where there is motion between the first image and the second image. To identify unreliable pixels where there is motion between the first image and the second image, the non-flash image can be clustered via the intensity chromaticity. For the initial estimated white balance kernel, those elements with the largest distance to the center of the cluster are identified. Specifically, the center of cluster j is defined as:

$$W_j^c = \frac{1}{N} \sum_{p \in j} W^c(p)$$

and the distance of all the elements in the cluster to the center can be calculated by:

$$D_j(p) = \|W^c(p) - W_j^c - W_j^c\|_2^2 \forall p \in j$$

$D_j(p)$ is sorted and those pixels with the largest value are masked as incomplete in the white balance kernel. White balance correction is interpolated, at step 416, for the pixels in the first image that are not reliable (for example, masked as incomplete) based on the white balance kernel for pixels that are similar in color observed in the first image. In this way, white balance correction for the masked pixels can be interpolated utilizing the same algorithm as described above with respect to shadow pixels or specular points.

Figure 5:
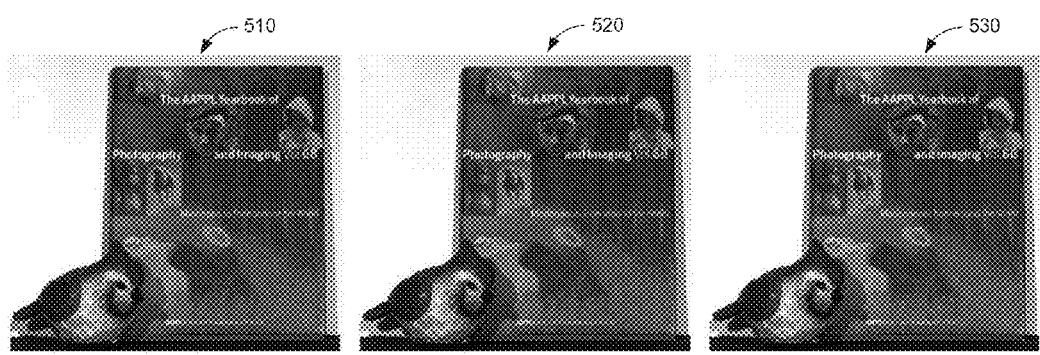
FIGS. 5 and 6 are color images illustrating white balancing, in accordance with embodiments of the present invention.
Figure 6:
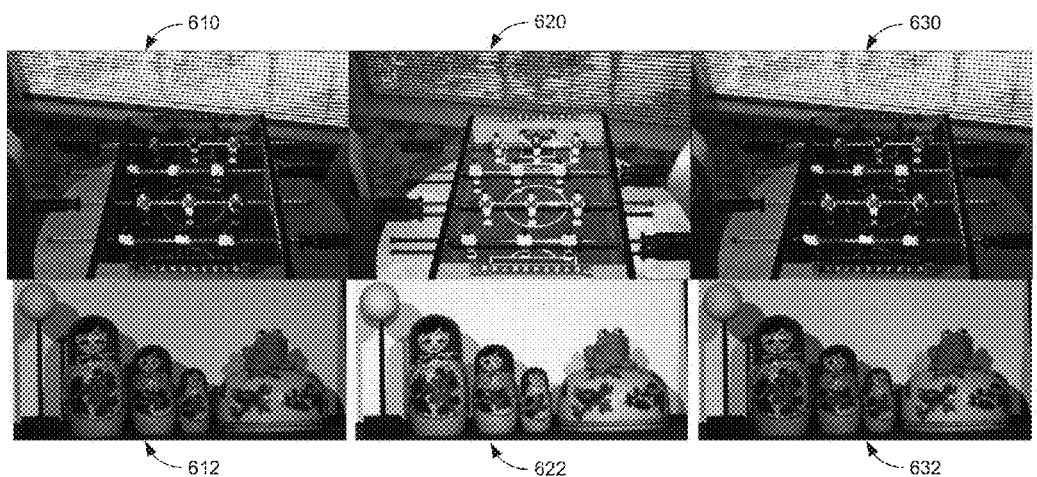

Referring next to FIGS. 5 and 6, color images illustrating white balancing in accordance with embodiments of the present invention are shown. Initially, FIG. 5 illustrates the image without flash 510, the white balance results 520, and the ground truth 530. In FIG. 6, the images are illustrated without flash 610, 612, with flash 620, 622 and the white balance results 630, 632. As shown in each figure, the white balance results 520, 630 illustrates the color of the ambient lights being tuned to neutral so the true color of the objects in the image (i.e., the ground truth) is shown.

Figure 7:
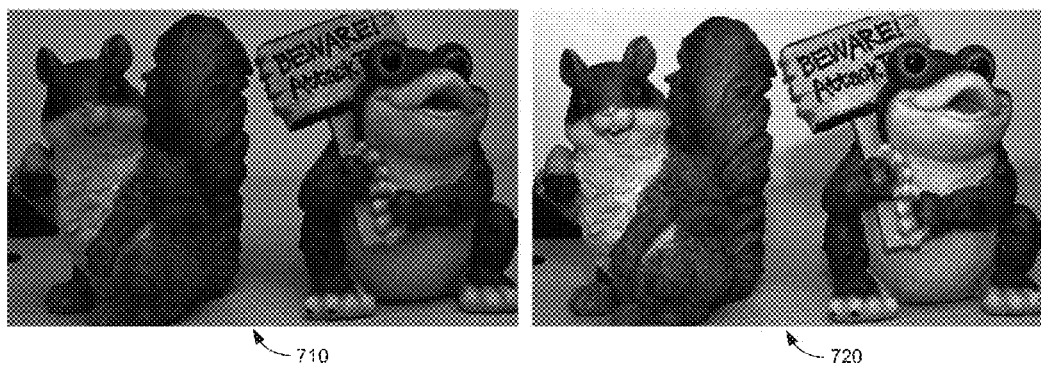
FIGS. 7-19 are color images illustrating white balance correction for unreliable pixels, in accordance with embodiments of the present invention.

FIGS. 7-21 are color photographs illustrating white balance correction for unreliable pixels, in accordance with embodiments of the present invention. With initial reference to FIGS. 7-13, white balance correction is illustrated for shadow and/or specular regions. The assumption that is relied upon is that pixels with similar color should have the same white balance kernels. The pixels that are outliers or are not reliable can be detected by introducing the flash image. For example, and referring to FIG. 7, the image without flash 710 is compared to the image with flash 720. As illustrated, the shadows are apparent in the image with flash 720.

Figure 8:
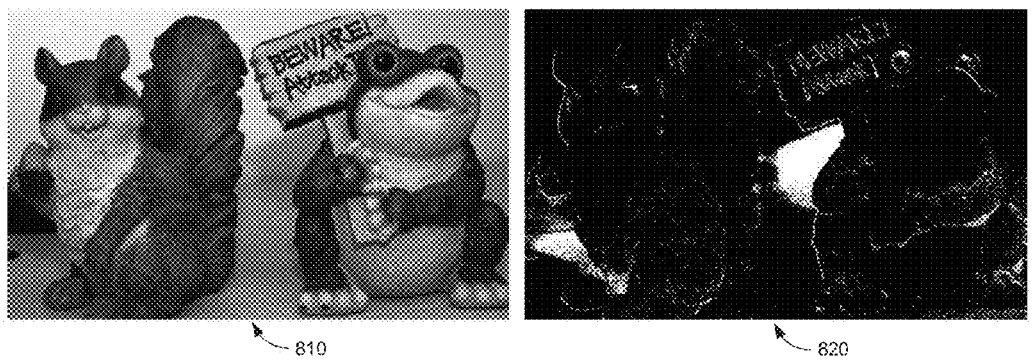
Figure 9:
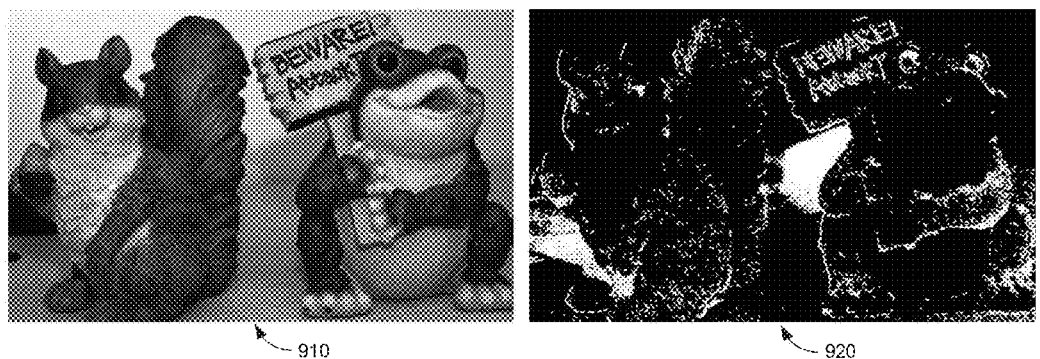
Figure 10:
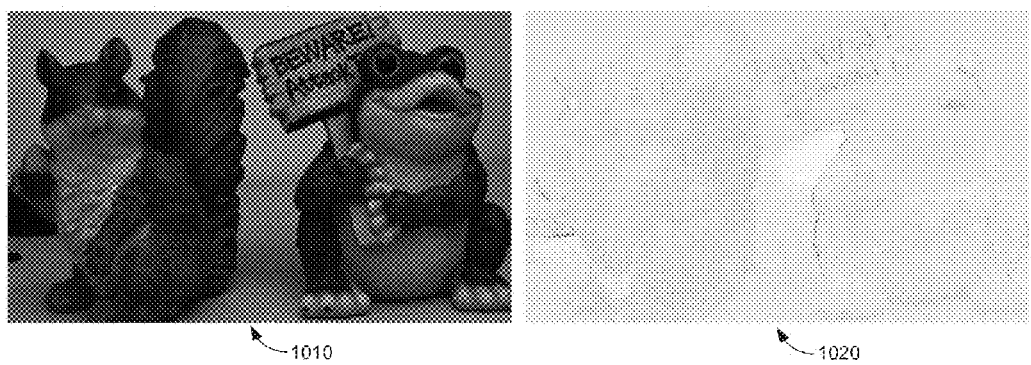
Figure 11:
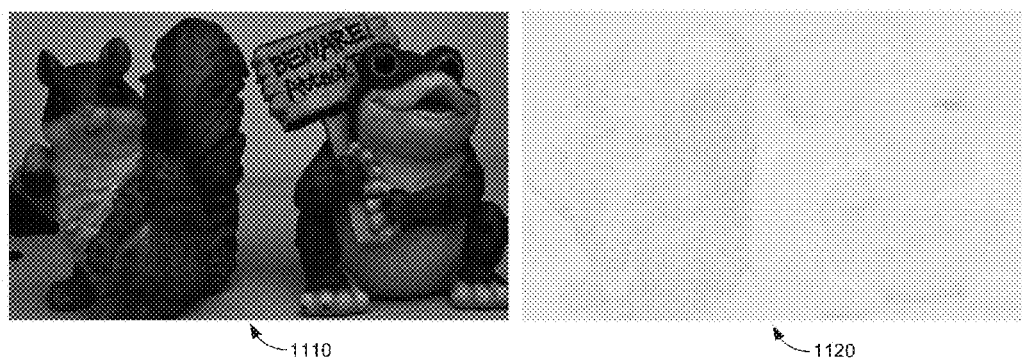
Figure 12:
Figure 13:
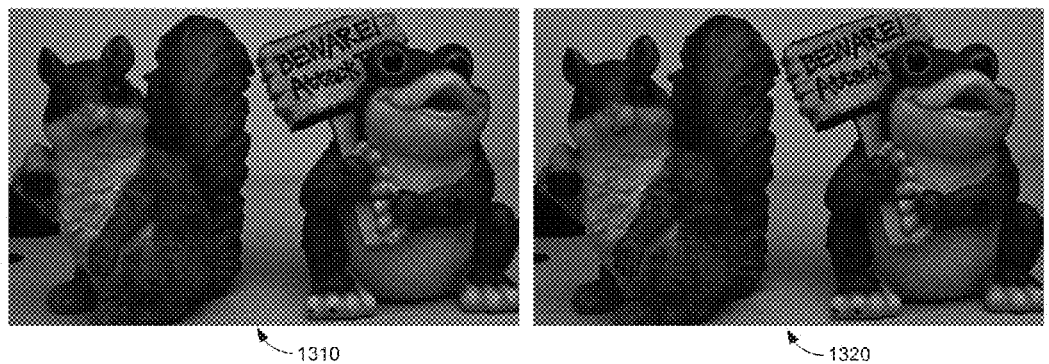

FIG. 8 illustrates the image with flash 810 adjacent to the image illustrating the detected umbra 820 (i.e., the fully shaded inner region of a shadow cast by an opaque object). This is contrasted in FIG. 9, to the image with flash 910 shown adjacent to the image illustrating the detected penumbra 920 (i.e., the partially shaded outer region of the shadow cast by an opaque object). As shown in FIG. 10, the image without flash 1010 is shown adjacent to the initial white balance kernel for the image 1020. After masking incomplete pixels and interpolating the white balance kernel, as described herein, the image without flash 1110 is shown adjacent to the refined white balance kernel for the image 1120 in FIG. 11. In FIG. 12, the initial white balance kernel is applied to the image without flash 1210 resulting in the image with initial white balance correction 1220 (without accounting for unreliable pixels). This can be contrasted to FIG. 13, which illustrates the refined white balance kernel applied to the image without flash 1310 resulting in the image with refined white balance correction 1320.

Figure 14:
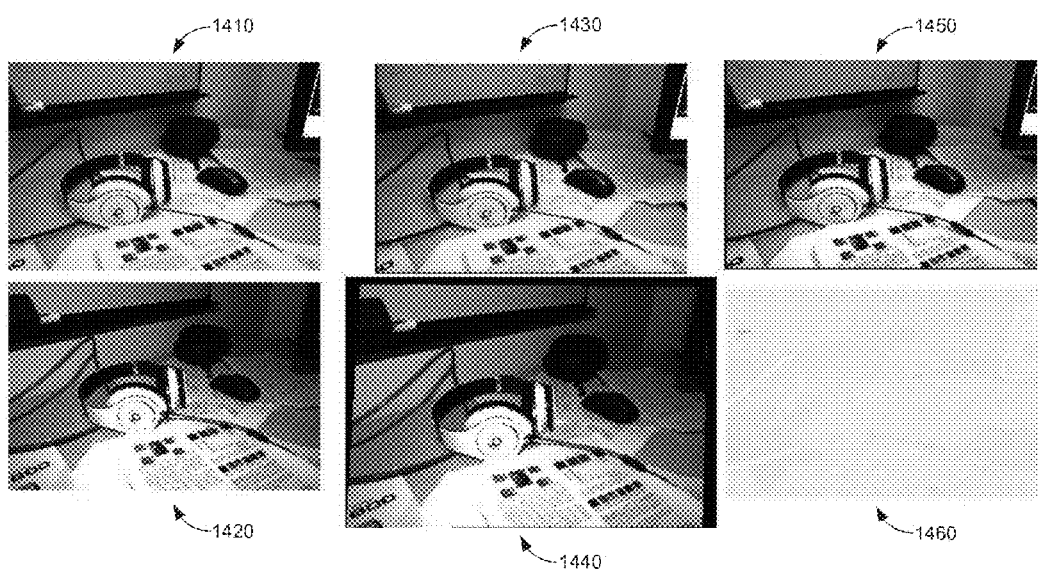

With reference now to FIGS. 14-19, white balance correction is illustrated for regions where there is motion between the first image and the second image. Initially, FIG. 14 illustrates the image without flash 1410 and the image with flash 1420. As illustrated, there is slight movement (i.e., rigid motion) between the two images 1410, 1420. To correct this movement, the images are aligned, as described herein, resulting in the aligned image without flash 1430 and the aligned image with flash 1440. Consequently, the white balance results 1450 and the white balance kernel 1460 are illustrated.

Figure 15:
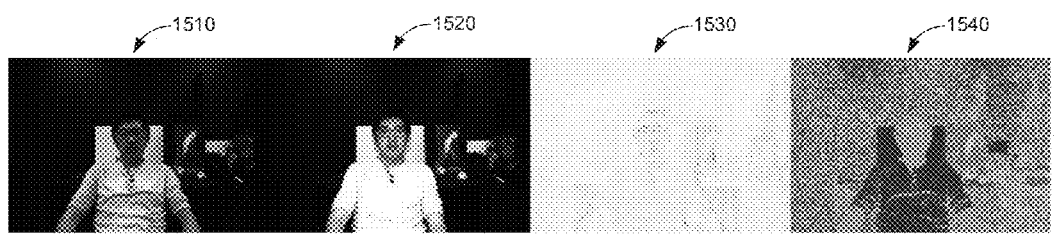
Figure 16:
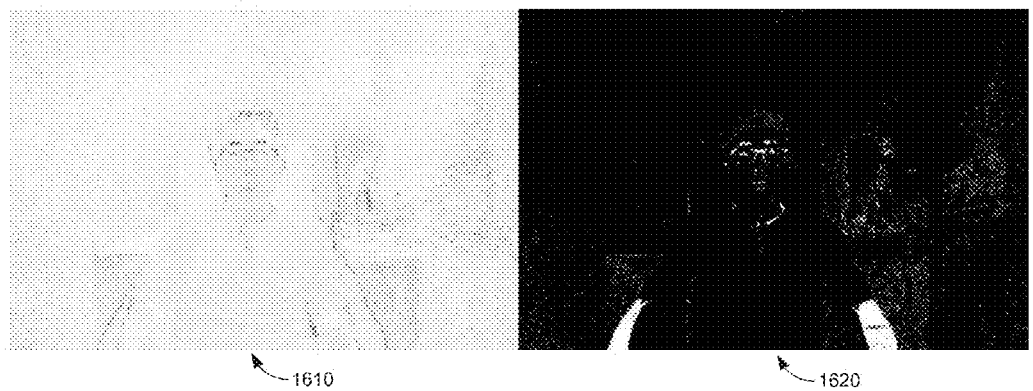
Figure 17:
Figure 18:
Figure 19:

Next, referring now to FIG. 15, an image is shown without flash 1510 and with flash 1520 where non-rigid motion is present. An initial white balance kernel 1530 can be determined and clustered based on the intensity observed in the non-flash image. The clustering results 1540 reveal outliers in each cluster which can be masked as pixels with non-rigid motion. FIG. 16 illustrates the white balance kernel 1610 adjacent to the detected outliers 1620. Thus, the detected outliers 1620 can be masked and interpolated, as described herein. FIG. 17 illustrates the white balance kernel 1710 adjacent to the refined white balance kernel 1720. Applying each of the white balance kernel and the refined white balance kernel to the image without flash results in the white balance results 1810 and the refined white balance results 1820 as illustrated in FIG. 18. Referring now to FIG. 19, the difference between the original image without flash 1910 and the refined white balance results 1920 is stark.

Figure 20:
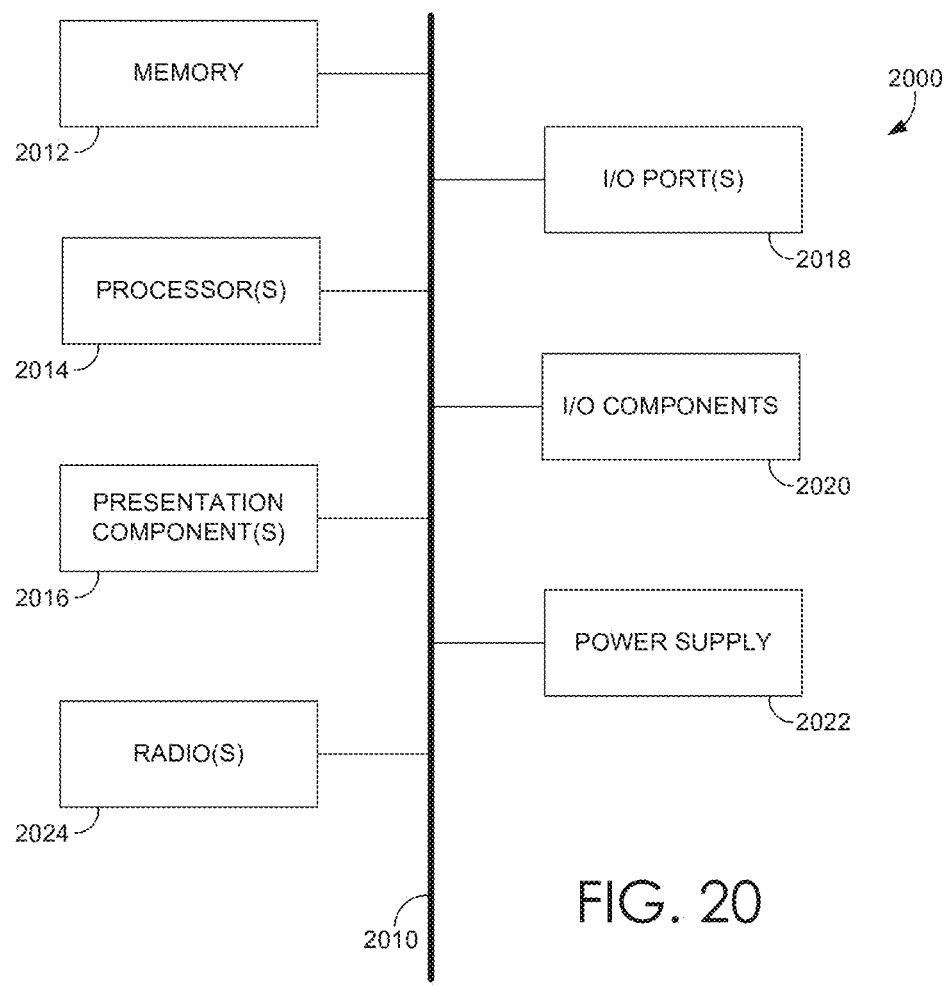
FIG. 20 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 20 in particular, an exemplary operating environment for implementing embodiments of the present invention is shown and designated generally as computing device 2000. Computing device 2000 is but one example of a suitable computing environment and is not intended to suggest any limitation as to the scope of use or functionality of the invention. Neither should the computing device 2000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 20, computing device 2000 includes a bus 2010 that directly or indirectly couples the following devices: memory 2012, one or more processors 2014, one or more presentation components 2016, input/output (I/O) ports 2018, input/output components 2020, and an illustrative power supply 2022. Bus 2010 represents what may be one or more busses (such as an address bus, data bus, or combination thereof). Although the various blocks of FIG. 20 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 20 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 20 and reference to "computing device."

Computing device 2000 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2012 includes computer-storage media in the form of volatile and/or nonvolatile memory. The memory may be removable, non-removable, or a combination thereof. Exemplary hardware devices include solid-state memory, hard drives, optical-disc drives, etc. Computing device 2000 includes one or more processors that read data from various entities such as memory 2012 or I/O components 2020. Presentation component(s) 2016 present data indications to a user or other device. Exemplary presentation components include a display device, speaker, printing component, vibrating component, etc.

I/O ports 2018 allow computing device 2000 to be logically coupled to other devices including I/O components 2020, some of which may be built in. Illustrative components include a microphone, joystick, game pad, satellite dish, scanner, printer, wireless device, etc. The I/O components 2020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 2000. The computing device 2000 may be equipped with depth cameras, such as, stereoscopic camera systems, infrared camera systems, RGB camera systems, and combinations of these for gesture detection and recognition. Additionally, the computing device 2000 may be equipped with accelerometers or gyroscopes that enable detection of motion. The output of the accelerometers or gyroscopes may be provided to the display of the computing device 2000 to render immersive augmented reality or virtual reality.

As can be understood, embodiments of the present invention automatically white-balancing images captured under mixed lighting conditions. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage media storing computer-useable instructions that, when used by one or more computing devices, cause the one or more computing devices to perform operations comprising:
    receiving two images comprising a scene, wherein a first image is captured without utilizing flash and a second image is captured utilizing flash;
    estimating, utilizing the first image and the second image, a per-pixel white balance kernel at one or more pixels in the first image;
    calculating a threshold for low light for each of the one or more pixels;
    sorting the one or more pixels in terms of thresholds calculated;
    selecting a minimum percentage of the one or more pixels as shadow pixels;
    masking white balance kernels at the one or more shadow pixels in the first image; and
    automatically correcting, utilizing the per-pixel white balance kernel, white balance at the one or more pixels in the first image to generate a white-balanced image.

2. The one or more computer storage media of claim 1, wherein the white balance is automatically corrected without requiring any user input.

3. The one or more computer storage media of claim 1, wherein the white balance is automatically corrected without requiring any user assumptions about the lighting in the scene.

4. The one or more computer storage media of claim 1, wherein an intensity value for a single color channel of each image can be defined based on a Lambertian assumption.

5. The one or more computer storage media of claim 1, further comprising acquiring a color of the flash.

6. The one or more computer storage media of claim 1, further comprising preserving image intensities after the white balance correction.

7. The one or more computer storage media of claim 1, further comprising interpolating the white balance kernels for incomplete regions of the first image based on the white balance kernels for pixels similar in color observed in the first image.

8. The one or more computer storage media of claim 7, wherein interpolating the white balance kernels comprises:
    selecting nearest neighbors in terms of intensity for a particular masked pixel from unmasked regions; and
    calculating weights that each nearest neighbor contributes to the particular masked pixel based on intensity difference.

9. The one or more computer storage media of claim 1, further comprising eliminating an effect of dark albedo on shadow detection.

10. The one or more computer storage media of claim 1, further comprising
    selecting a minimum ten percent of the one or more pixels as shadow pixels.

11. The one or more computer storage media of claim 1, further comprising detecting penumbra pixels by checking gradient difference and connectedness to the shadow pixels.

12. The one or more computer storage media of claim 1, further comprising detecting specular pixels in the first image based on pixels introducing stronger gradient in the second image than in the first image.

13. The one or more computer storage media of claim 12, further comprising:
    calculating a per-pixel threshold for a difference in gradient between the first image and the second image;
    sorting the one or more pixels by the calculated thresholds and masking a largest ten percent of the one or more pixels as the specular pixels; and
    utilizing morphology operations to fill holes in the specular pixels.

14. The one or more computer storage media of claim 1, further comprising aligning pixels in the first image and the second image based on scale-invariant feature transform (SIFT) and Random sample consensus (RANSAC).

15. The one or more computer storage media of claim 14, further comprising:
    detecting pixels in the first image that have a similar color but a different white balance kernel;

clustering the pixels of the first image based on intensity chromaticity; and calculating a distance of each pixel in the cluster to a center of the cluster.

16. The one or more computer storage media of claim 15, further comprising:

sorting the pixels based on the distance of each pixel to the center;

masking the pixels in the first image with a largest distance as incomplete pixels in the white balance kernel; and interpolating the white balance kernels for the incomplete pixels in the first image based on the white balance kernels for the pixels that have a similar color observed in the first image.

17. A computerized system comprising:

one or more processors; and a non-transitory computer storage media storing computer-useable instructions that, when used by the one or more processors, cause the one or more processors to:

receive two images, wherein a first image is captured without utilizing flash and a second image is captured utilizing flash;

estimate, utilizing the first image and the second image, a per-pixel white balance kernel at one or more pixels in the first image;

calculate a threshold for low light for each of the one or more pixels;

sort the one or more pixels in terms of thresholds calculated;

select a minimum percentage of the one or more pixels as shadow pixels;

mask white balance kernels at the one or more shadow pixels in the first image; and automatically correct, utilizing the per-pixel white balance kernel, a white balance at the one or more pixels in the first image to generate a white-balanced image.

18. A non-transitory computer storage media storing computer-useable instructions that, when used by one or more computing devices, cause the one or more computing devices to perform operations comprising:

receiving two images comprising a scene, wherein a first image is captured without utilizing flash and a second image is captured utilizing flash;

estimating, utilizing the first image and the second image, a per-pixel white balance kernel at one or more pixels in the first image;

detecting specular pixels in the first image based on pixels introducing stronger gradient in the second image than in the first image;

sorting the one or more pixels according to strength of gradient and masking a percentage of the one or more pixels as the specular pixels;

utilizing morphology operations to fill holes in the specular pixels; and automatically correcting, utilizing the per-pixel white balance kernel, white balance at the one or more pixels in the first image to generate a white-balanced image.

19. The media of claim 18, wherein the percentage is ten percent of the one or more pixels with the largest gradients.

* * * * *